(12) United States Patent
Ogose

(10) Patent No.: US 10,017,050 B2
(45) Date of Patent: Jul. 10, 2018

(54) VALVE DEVICE

(71) Applicant: NIFCO INC., Yokosuka-shi, Kanagawa (JP)

(72) Inventor: Kensuke Ogose, Yokosuka (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 64 days.

(21) Appl. No.: 15/118,286

(22) PCT Filed: Feb. 10, 2015

(86) PCT No.: PCT/JP2015/053635
§ 371 (c)(1),
(2) Date: Aug. 11, 2016

(87) PCT Pub. No.: WO2015/122407
PCT Pub. Date: Aug. 20, 2015

(65) Prior Publication Data
US 2016/0355085 A1 Dec. 8, 2016

(30) Foreign Application Priority Data

Feb. 12, 2014 (JP) ................. 2014-024405

(51) Int. Cl.
*B60K 15/035* (2006.01)
*F16K 24/04* (2006.01)
*F16K 27/02* (2006.01)
*F16K 31/22* (2006.01)
*B60K 15/03* (2006.01)

(52) U.S. Cl.
CPC ...... *B60K 15/03519* (2013.01); *F16K 24/044* (2013.01); *F16K 27/02* (2013.01);
(Continued)

(58) Field of Classification Search
CPC .... B60K 15/03519; B60K 2015/03289; B60K 2015/03576; F16K 31/22; F16K 27/02;
(Continued)

(56) References Cited

U.S. PATENT DOCUMENTS 4,702,268 A * 10/1987 Ambruster ............ F16K 17/366
137/202
4,785,484 A * 11/1988 Sargent ................... A61H 33/60
137/202
(Continued)

FOREIGN PATENT DOCUMENTS

JP   H09-14489 A    1/1997
JP   2009-085390 A  4/2009
(Continued)

OTHER PUBLICATIONS

PCT International Search Report of PCT/JP2015/053635.

*Primary Examiner* — Michael R Reid
(74) *Attorney, Agent, or Firm* — Manabu Kanesaka

(57) ABSTRACT

A valve device includes a float and a case storing the float. The valve device forms a part of a ventilation passage of a fuel tank. The case includes a partition wall which divides inside the case into an upper chamber and a storage chamber to house the float. The partition wall includes a rising portion opened and closed by the float, and a rising portion which surrounds the opening in the upper chamber. A dividing portion is formed in the rising portion to guide liquid to flow downward, and an upper surface of the partition wall outside the rising portion is formed with a gradient such that a side of the dividing part is a low part of an inclined portion thereof.

6 Claims, 5 Drawing Sheets

(52) U.S. Cl.
CPC .... *F16K 31/22* (2013.01); *B60K 2015/03289* (2013.01); *B60K 2015/03576* (2013.01)

(58) Field of Classification Search
CPC ............. F16K 24/044; Y10T 137/0874; Y10T 137/3099; Y10T 137/3084; Y10T 137/3087; Y10T 137/309
USPC ........................... 137/43, 202, 197, 198, 199
See application file for complete search history.

(56) References Cited

U.S. PATENT DOCUMENTS

| | | | |
|---|---|---|---|
| 5,392,804 A * | 2/1995 | Kondo | B60K 15/03519 123/519 |
| 2009/0084449 A1 | 4/2009 | Matsuo | |
| 2009/0293962 A1 | 12/2009 | Ando et al. | |
| 2013/0025700 A1* | 1/2013 | Kito | F16K 24/044 137/202 |
| 2013/0160867 A1 | 6/2013 | Nemeth | |
| 2013/0160869 A1* | 6/2013 | Pifer | F16K 24/044 137/343 |

FOREIGN PATENT DOCUMENTS

| | | | | |
|---|---|---|---|---|
| JP | 2009-286318 A | 12/2009 | | |
| JP | 4939120 B2 | 5/2012 | | |
| JP | 2013-103562 A | 5/2013 | | |
| JP | WO 2013069239 A1 * | 5/2013 | ........... | F16K 24/044 |
| WO | 2008/088094 A1 | 7/2008 | | |

* cited by examiner

VALVE DEVICE

CROSS-REFERENCES TO RELATED APPLICATIONS

The present application is National Phase of International Application No. PCT/JP2015/053635 filed Feb. 10, 2015, and claims priority from Japanese Patent Application No. 2014-024405, filed on Feb. 12, 2014, the disclosure of which is hereby incorporated by reference herein in its entirety.

TECHNICAL FIELD

The present invention relates to an improvement in a valve device which is mounted to a fuel tank of a vehicle or a two-wheeled vehicle and functions to communicate the inside and the outside of the fuel tank in an opened state.

BACKGROUND ART

Patent Literature 1 discloses a valve device in which a housing is divided into an upper chamber and a lower chamber by a diaphragm having an opening portion, and the lower chamber stores a float. When fuel enters into the housing, the opening portion is closed by the float so as to prevent leakage of the fuel from an exhaust port of the upper chamber to the outside of the tank.

In the valve device, the opening portion is enclosed in the upper chamber by a cylindrical partition wall. In the partition wall, an exhaust port and a notch portion are formed with the opening portion interposed therebetween. When the liquid fuel enters into the upper chamber, the fuel flows down from the notch portion to the lower chamber through the opening portion.

CITATION LIST

Patent Literature

Patent Literature 1: Japanese Patent No. 4939120

BRIEF SUMMARY OF THE INVENTION

Technical Problem

A main problem to be solved by the present invention is to cause the liquid fuel to more securely flow down below the upper chamber when the liquid fuel enters the upper chamber in such a type of valve device, and to securely prevent the fuel from leaking outside of the tank.

Solution to Problem

To solve the above problem, in the present invention, there is provided a valve device that forms a part of a ventilation passage of a fuel tank, the valve device including: a float; and a case that stores the float. The case includes a partition wall that divides an inside of the case into an upper chamber and a storage chamber for the float. The partition wall includes an opening that is opened and closed by the float, and a rising portion that surrounds the opening in the upper chamber. The rising portion is formed with a dividing portion for guiding liquid to flow downward. An upper surface of the partition wall outside the rising portion is provided with a gradient such that a side of the dividing part is a low part of an inclined portion thereof.

According to the valve device, with the rising portion, the liquid fuel is prevented from leaking from the upper chamber to the outside of the tank as little as possible when the liquid fuel typically splashes into the upper chamber. In this way, when the liquid fuel enters, the fuel can be guided to the dividing portion by the upper surface of the partition wall outside the rising portion so as to flow down to the storage chamber through the opening.

According to an aspect of the invention, the dividing portion is formed at a position except at a position between an exhaust port of the upper chamber and the opening. In addition, according to an aspect of the invention, the dividing portion is formed at a position most separated from the exhaust port. With such a configuration, an outflow of the liquid fuel guided toward the dividing portion at the upper surface of the partition wall outside the rising portion is prevented from flowing outside of the tank through the exhaust port.

In addition, according to an aspect of the invention, another dividing portion for exhausting is formed at a position between an exhaust port of the upper chamber in the rising portion and the opening, and a width of the another dividing portion is larger than that of the dividing portion. With such a configuration, fuel evaporative gas can be guided to the exhaust port with a low pressure loss.

In addition, according to an aspect of the invention, an inner side portion of the rising portion is formed with a gradient such that the opening is a low part of an inclined portion thereof. With such a configuration, the liquid fuel adhering to the inner side portion of the rising portion can smoothly flow to the storage chamber through the opening.

Advantageous Effects of Invention

According to the present invention, when the liquid fuel enters the upper chamber of the valve device, the fuel can be guided toward the dividing portion by the upper surface of the partition wall outside the rising portion, and can securely flow down from the dividing portion to the storage chamber through the opening.

DETAILED DESCRIPTION OF THE INVENTION

Figure 1:
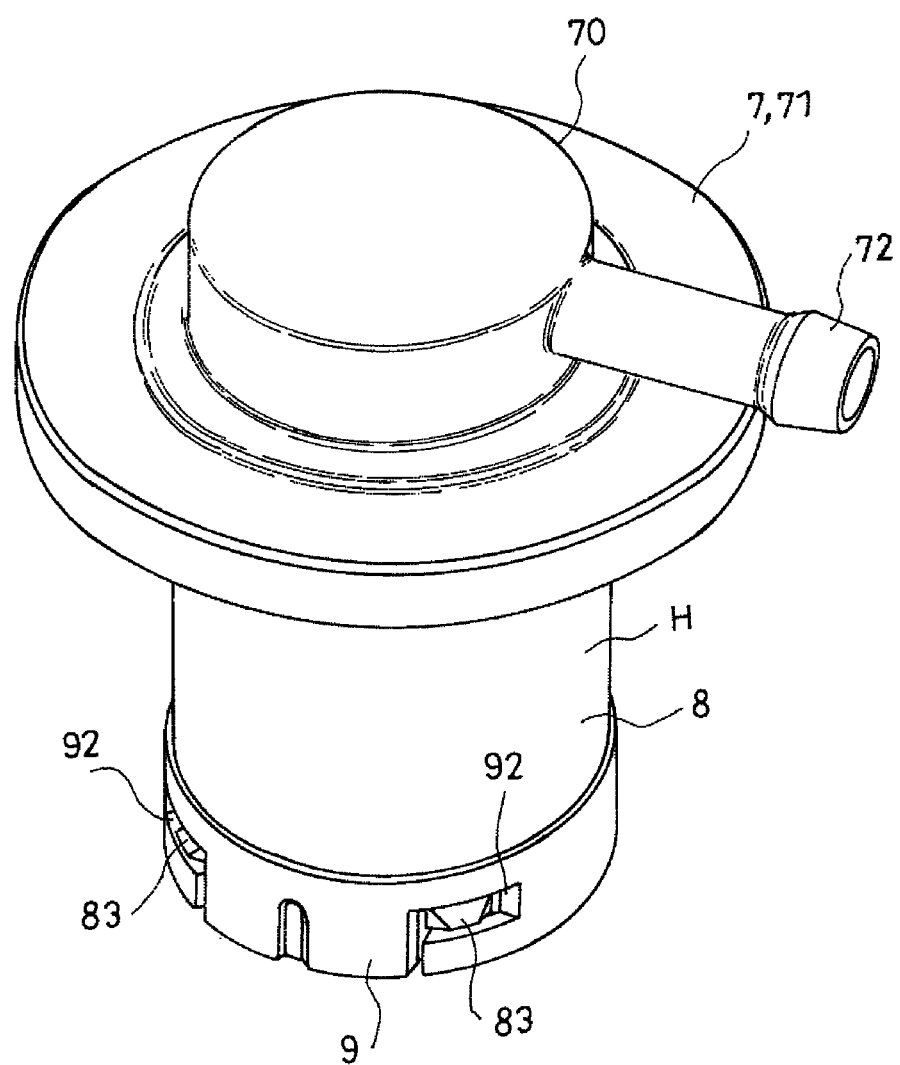
FIG. 1 is a perspective view of a valve device according to an embodiment of the present invention.

Hereinafter, a typical embodiment of the present invention will be described based on FIGS. 1 to 5. A valve device according to the embodiment is mounted in a fuel tank T of a vehicle or a two-wheeled vehicle and functions to communicate the inside and the outside of the fuel tank T in an opened state. The valve device is typically mounted in the upper portion of the fuel tank T and forms a part of a ventilation passage C of the fuel tank T. As the embodiment shown in the drawing, the valve device can be installed in the fuel tank T using an attaching hole Tb provided in the fuel tank T or using a bracket (not illustrated) provided in the fuel tank T.

Figure 4:
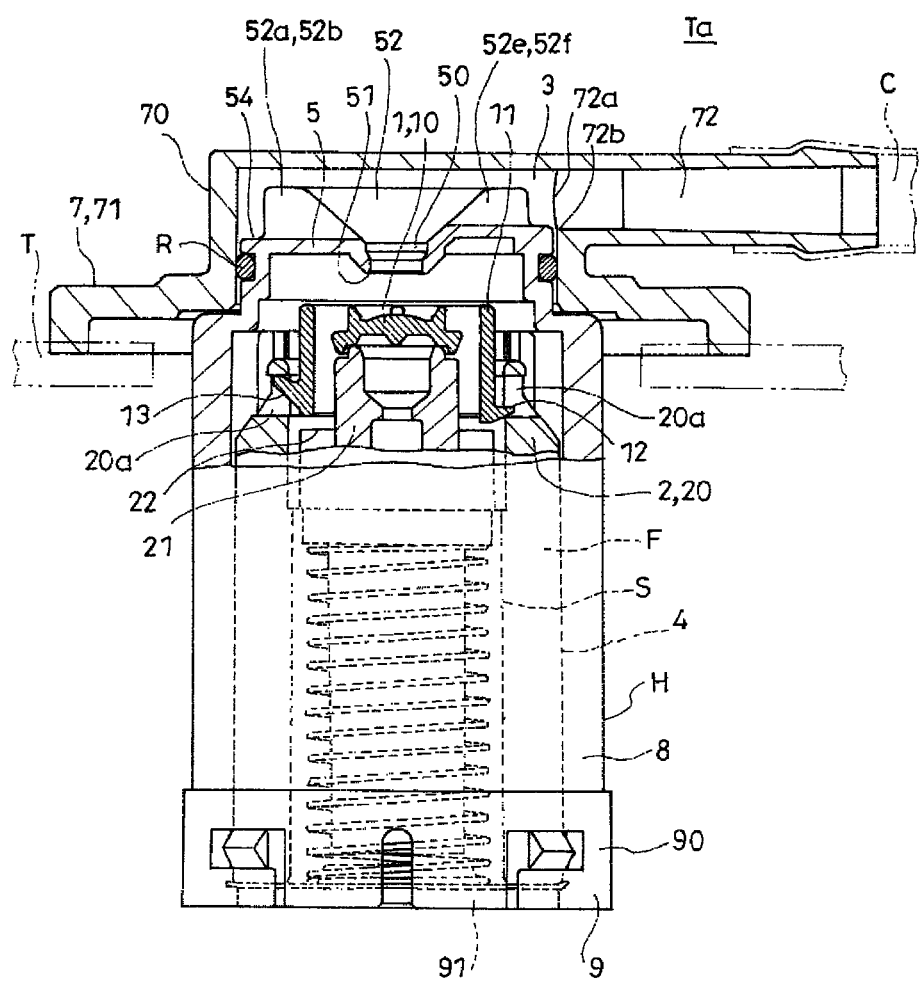
FIG. 4 is a side view of the valve device partially broken.

The valve device includes a float F and a case H containing the float (see FIG. 4). The case H includes a partition wall 5 which separates the case H into an upper chamber 3 and a storage chamber 4 of the float F. The upper chamber 3 is provided above the partition wall 5 and communicates with the outside Ta of the tank through an exhaust port 72. The storage chamber 4 is provided below the partition wall 5 and contains the float F therein to move up and down. The storage chamber 4 is configured such that fuel flows thereinto from an inlet portion (not illustrated) formed in a cap 9 described below which is formed in the bottom portion of the case H. In addition, a ventilation portion 6 is formed in the side surface of the case H to communicate with the storage chamber 4. When the float F is at a falling position, the inside and the outside of the tank communicate with each other through the inlet portion, the ventilation portion 6, an opening 50 formed in the partition wall 5, and the exhaust port (FIG. 4). When the fuel flows into the storage chamber 4, the rim of the opening 50 facing the storage chamber 4 serves as a valve seat 51, and the float F raises a valve body 1 provided thereon up to a position to be seated at the valve seat 51. Therefore, the communication between in and out of the tank is blocked. When the fuel flows out of the storage chamber 4, the float F falls again and the inside and the outside of the tank communicate again through the valve device.

In the embodiment shown in the drawing, the case H is configured by combining a flange 7, a case body 8, and the cap 9. These components are typically made of plastic.

The case body 8 includes the opening 50 in the upper center, and is formed in a substantially cylinder shape of which the lower end is open. The upper portion of the case body 8 is formed to be narrow in diameter compared to the other portion, and a circumferential stepped surface 81 is formed on the outside of the upper portion of the case body 8 from a reduced-diameter portion 80 (see FIG. 3). In addition, a circumferential groove 82 is formed on the outer circumferential portion of the reduced-diameter portion 80. The opening 50 is formed in the upper center portion of the reduced-diameter portion 80.

The flange 7 has an inner diameter substantially equal to the outer diameter of the reduced-diameter portion 80 of the case body 8 and closes the upper end of the cylinder, and is provided with a short cylinder portion 70 of which the lower end is open, an outer flange portion 71 which is formed in the lower end of the short cylinder portion 70, and the exhaust port 72 of which the one end integrally communicates with the side portion of the short cylinder portion 70 to form a cylindrical shape extending in the horizontal direction.

The reduced-diameter portion 80 of the case body 8 is fitted into the short cylinder portion 70 up to a position where the circumferential stepped surface 81 of the case body 8 abuts on the outer flange portion 71 of the flange 7, so that the case body 8 and the flange 7 are integrated with each other. In a state where the case body 8 and the flange 7 are assembled as described above, a space defining the upper chamber 3 is formed between the upper end of the case body 8 (that is, the upper portion of the reduced-diameter portion 80) and a closed end of the short cylinder portion 70. Therefore, the upper portion of the reduced-diameter portion 80 is configured to function as the partition wall 5. Reference R in the drawing indicates a seal ring which is mounted in the reduced-diameter portion 80 utilizing the circumferential groove, and the reduced-diameter portion 80 and the short cylinder portion 70 are sealed in an airtight state by the seal ring R.

The cap 9 is provided with a short cylinder portion 90 which has an inner diameter substantially equal to the outer diameter of the lower end of the case body 8 and a bottom plate 91 which closes the lower end of the cylinder of the short cylinder portion 90 (see FIG. 4). When the lower end side of the case body 8 is input into the cap 9 after the float F is mounted below the partition wall 5 of the case body 8, an engaging projection 83 formed in the case body 8 is engaged with an engaging window 92 which is formed in the short cylinder portion 90 of the cap 9 (see FIG. 3), the lower end of the case body 8 is closed by the cap 9, and the float F at the falling position is supported by the bottom plate 91 of the cap (see FIG. 4). The inlet portion (not illustrated) is formed in the bottom plate 91 of the cap 9.

In the embodiment shown in the drawing, the float F includes a float body 2 which is formed by disposing an inner cylinder portion 21 in an outer cylinder portion 20 through a connection portion 22, and the valve body 1 which is assembled to obliquely move in the upper portion of the float body 2 (see FIG. 4). In an annular space between the outer cylinder portion 20 and the inner cylinder portion 21, a compression coil spring S is provided such that the upper end of the spring abuts on the connection portion 22 and the lower end of the spring abuts on the bottom plate 91 of the cap 9, so that the compression coil spring S is stored to apply a constant urging force upward with respect to the float F. The valve body 1 includes a center portion 10 which is seated in the valve seat 51, and an outer circumferential portion 11 which encloses the center portion 10. The outer circumferential portion 11 is configured such that the lower end side of the outer circumferential portion 11 is positioned inside the outer cylinder portion 20 in a state where the center portion 10 is rotatably disposed on the upper end of the inner cylinder portion 21. A plurality of engaging claws 12 and 13 is formed in the outer circumferential portion 11 with respect to an engaging window 20a which is formed in the upper portion of the outer cylinder portion 20 of the float body 2. In FIG. 4, the engagement position of the engaging claw 13 positioned on the left side is positioned at an upper side than the engaging claw positioned on the right side, and the valve body 1 is separated when the left side of FIG. 4 is tilted to the lower side by the operation of the engaging claw 13 positioned on the left side when the float F falls down by a flow of fuel from the storage chamber 4 after being seated.

In the embodiment shown in the drawing, the valve device is configured to be mounted to the fuel tank T by fixing the outer flange portion 71 of the flange 7 to the outer surface of the fuel tank T typically using an adhesive in a state where the portion lower than the flange 7 is inserted to the attaching hole Tb open in the upper portion of the fuel tank T. The exhaust port 72 is configured to be fitted to one end of a pipe P of the ventilation passage C.

Figure 2:
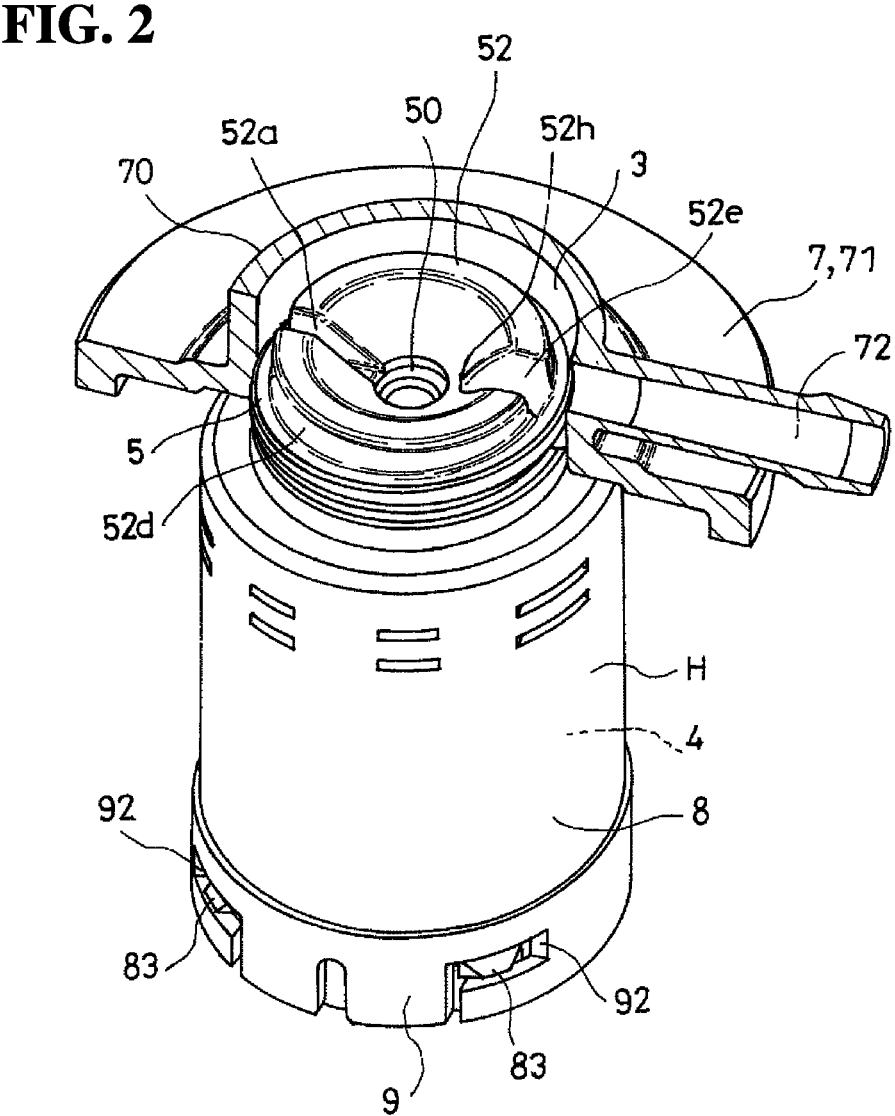
FIG. 2 is a perspective view of the valve device partially broken.
Figure 3:
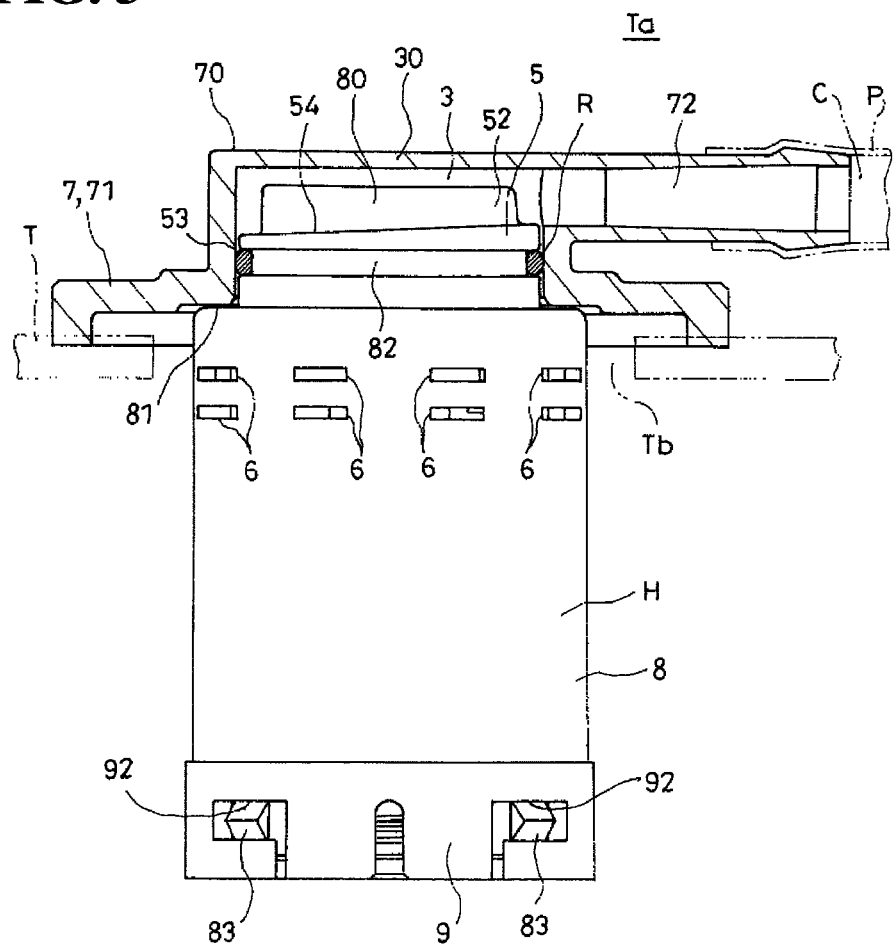
FIG. 3 is a side view of the valve device partially broken.

In this embodiment, as illustrated in FIG. 2, the partition wall 5 is provided with a rising portion 52 which encloses the opening 50 in the upper chamber 3. Then, a dividing portion 52a is formed in the rising portion 52 to make liquid flow down. Similarly, an upper surface 54 of the partition wall 5 outside the rising portion 52 is formed with a gradient such that a low part of the gradient is at a side with the dividing portion 52a (see FIG. 3).

In the embodiment shown in the drawing, the partition wall 5 is formed in a circular plate shape. The rising portion is formed in a cylindrical shape of which the outer circumferential portion is short, and the inner circumference portion is formed in a mortar shape. A gap is formed between the upper end of the rising portion 52 and the closed end of the short cylinder portion 70 serving as a ceiling 30 of the upper chamber 3. A gap is formed between an outer circumferential portion 52d of the rising portion 52 and an outer edge 53 of the partition wall 5 in a direction around the opening 50 (see FIG. 3).

Therefore, according to the valve device of this embodiment, with the rising portion 52, the liquid fuel is prevented from leaking from the upper chamber 3 to the outside Ta of the tank as much as possible when the liquid fuel is typically splashed into the upper chamber 3. In this way, when the liquid fuel enters, the fuel can be introduced to the dividing portion 52a by the upper surface 54 of the partition wall 5 outside the rising portion 52 so as to flow down to the storage chamber 4 through the opening 50.

The dividing portion 52a is formed at a position except at a position between the exhaust port 72 of the upper chamber 3 and the opening 50 (see FIG. 2). In the embodiment shown in the drawing, the dividing portion 52a is formed at a position most separated away from the exhaust port 72. With such a configuration, an outflow of the liquid fuel guided toward the dividing portion 52a to the outside Ta of the tank through the exhaust port 72 can be prevented by the upper surface 54 of the partition wall 5 outside the rising portion 52.

Figure 5:
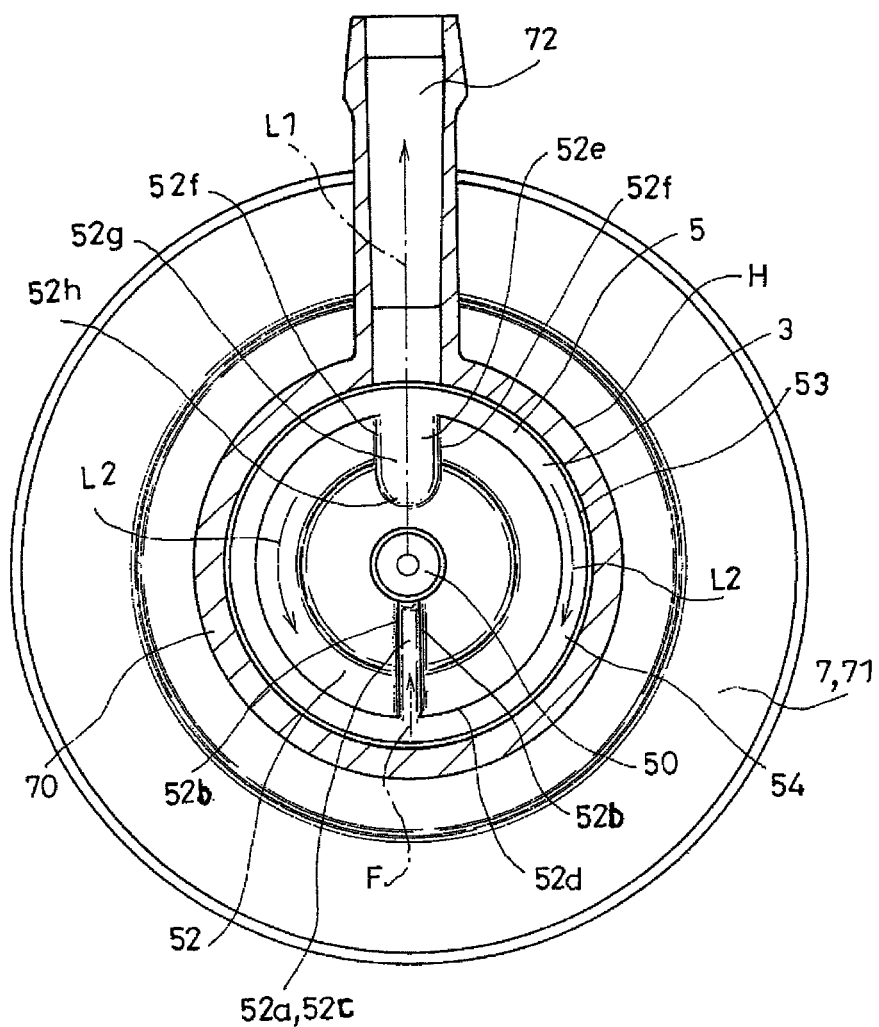
FIG. 5 is a plan view of the valve device partially broken.

The dividing portion 52a is configured by a groove which is formed to cut a part of the rising portion 52 along a virtual straight line extending in a radial shape from the center of the opening 50 (see FIG. 5). In other words, the dividing portion 52a includes a pair of groove walls 52b and 52b along the virtual straight line and a groove bottom 52c. The groove bottom 52c of the dividing portion 52a is formed in a horizontal plane flush with the lowest position of the upper surface 54 of the partition wall 5 outside the rising portion 52.

In addition, according to this embodiment, another dividing portion 52e for exhausting is formed at a position between the exhaust port 72 of the upper chamber 3 and the opening 50 (see FIG. 2). In the embodiment shown in the drawing, the another dividing portion 52e is formed at a position opposed to the dividing portion 52a with the opening 50 interposed therebetween (see FIG. 5). The another dividing portion 52e is also configured by a groove which is formed to cut a part of the rising portion 52 along a virtual straight line extending in a radial shape from the center of the opening 50. A groove outer end of the another dividing portion 52e is open in the outer circumferential portion 52d of the rising portion 52, and a groove inner end 52h does not reach the opening 50. In other words, the another dividing portion 52e also includes a pair of groove walls 52f and 52f and a groove bottom 52g along the virtual straight line. The groove bottom 52g of the another dividing portion 52e is formed in a horizontal plane flush with the highest position of the upper surface 54 of the partition wall 5 outside the rising portion 52. In addition, the groove bottom 52g is formed at a position at almost the same level as that of a lower edge 72b of a communication port 72a of the exhaust port 72. With such a configuration, fuel evaporative gas is guided to the exhaust port 72 with a low pressure loss.

In addition, according to this embodiment, a width of the another dividing portion 52e is made larger than that of the dividing portion 52a (see FIG. 5). In other words, a distance between the pair of groove walls 52f and 52f forming the another dividing portion 52e is made larger than that between the pair of groove walls 52b and 52b forming the dividing portion 52a. With this configuration, firstly, the fuel evaporative gas toward the exhaust port 72 can be sent out using the opening 50 and the another dividing portion 52e as a main stream. In addition, secondly, the flow (indicated by reference L1 in FIG. 5) of the main stream can cause an attraction force (indicated by reference F in FIG. 5) which draws the liquid fuel (flowing into the upper chamber 3 and guided (the guiding direction is indicated by reference L2 in FIG. 5) to the dividing portion 52a by the upper surface 54 of the partition wall 5 outside the rising portion 52) toward the opening 50 through the dividing portion 52a. The liquid fuel flowing into the upper chamber 3 can smoothly fall down to the storage chamber 4 through the opening 50.

In addition, according to this embodiment, the inner circumferential portion of the rising portion 52 is formed in a mortar shape as described above. Therefore, the inner side portion of the rising portion 52 is formed with a gradient such that the low part of the gradient is at the opening 50. With this configuration, according to this embodiment, the liquid fuel attached to the inner portion of the rising portion 52 smoothly flows to the storage chamber 4 through the opening 50.

Further, as a matter of course, the present invention is not limited to the above described embodiments, and includes all the embodiments which can achieve the object of the invention.

What is claimed is:

1. A valve device forming a part of a ventilation passage of a fuel tank, comprising:
   a float; and
   a case including
      a storage chamber storing the float,
      an upper chamber arranged above the storage chamber, and
      a partition wall dividing an inside of the case into the upper chamber and the storage chamber, the partition wall including
      an opening opened and closed by the float, and
      a rising portion surrounding the opening in the upper chamber and having an outer circumferential portion with a cylindrical shape, an inner circumferential portion with a funnel shape, and a dividing portion having a groove extending from the outer circumferential portion to the opening through the inner circumferential portion for guiding liquid to flow downward,
   wherein a gap is formed between the outer circumferential portion of the rising portion and an outer edge of the partition wall in a circumferential direction of the opening, and an upper surface of the partition wall outside the rising portion has a gradient such that a side of the dividing portion is a low part of an inclined portion thereof.

2. The valve device according to claim 1, wherein the dividing portion is formed at a position farthest away from an exhaust port.

3. The valve device according to claim 1, wherein another dividing portion for exhausting is formed at a position between an exhaust port of the upper chamber and the opening, and
   a width of the another dividing portion is larger than that of the dividing portion.

4. The valve device according to claim 1, wherein the inner circumferential portion of the rising portion has a gradient such that the opening is a lower side of the gradient.

5. The valve device according to claim 3, wherein the another dividing portion has another groove extending in a radial direction of the rising portion and communicating with the gap, the another dividing portion being arranged opposite to the dividing portion in respect to the opening.

6. The valve device according to claim 5, wherein the gap is defined by the outer circumferential portion of the rising portion, the outer edge of the partition wall, and the upper surface of the partition wall, and communicates with the dividing portion and the another dividing portion to guide the liquid toward the opening.

\* \* \* \* \*